Sept. 10, 1968 A. C. SAMPIETRO 3,400,945
VEHICLE LEADING ARM SUSPENSION SYSTEM
Filed Nov. 3, 1966 3 Sheets-Sheet 2

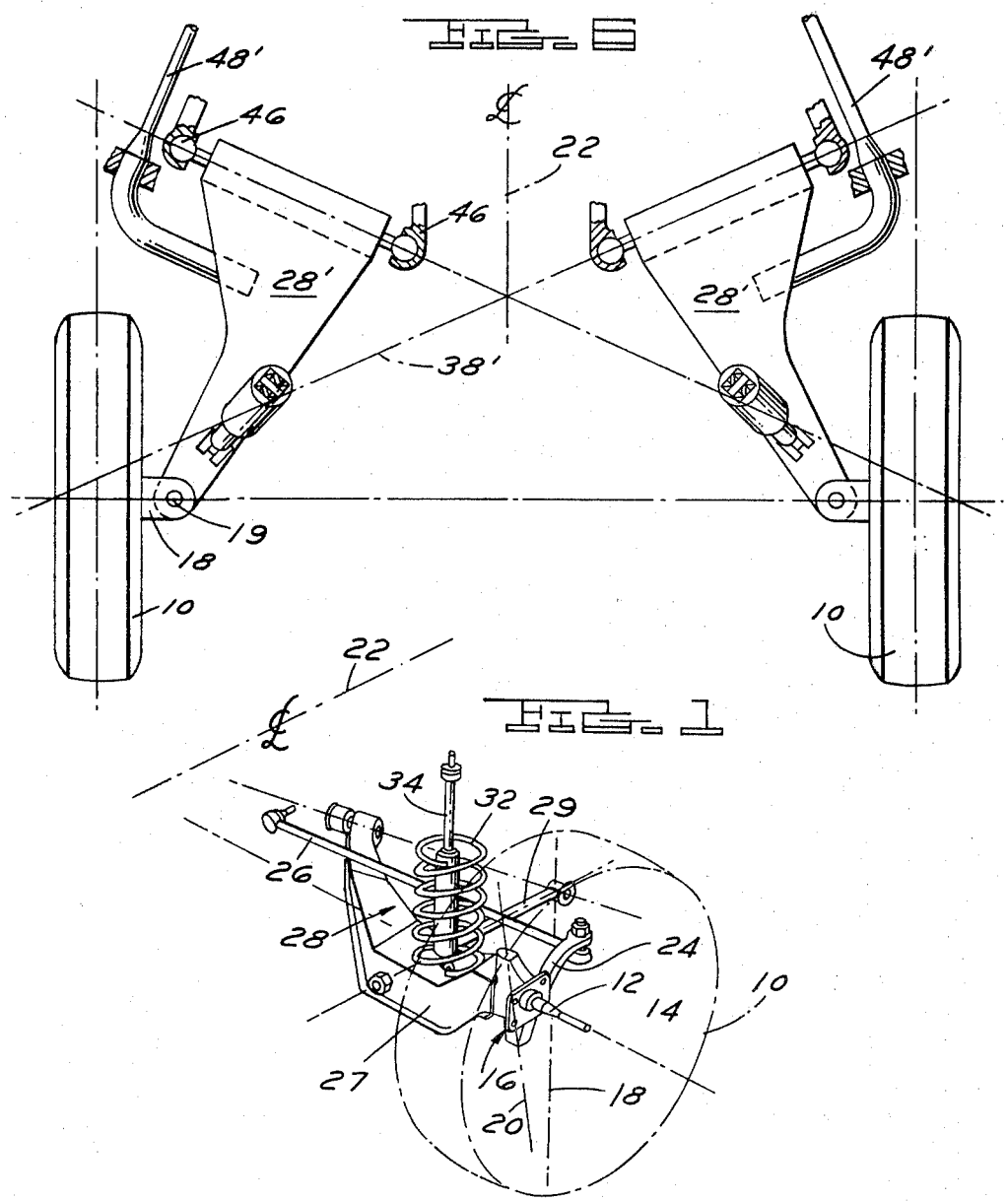

ACHILLE C. SAMPIETRO
INVENTOR

BY
John R. Faulkner
Robert E. McCollum
ATTORNEYS

Sept. 10, 1968     A. C. SAMPIETRO     3,400,945
VEHICLE LEADING ARM SUSPENSION SYSTEM
Filed Nov. 3, 1966     3 Sheets-Sheet 3
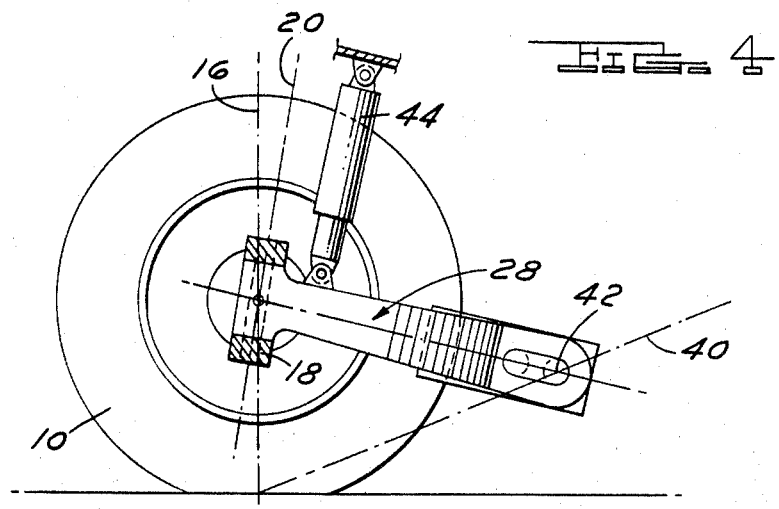
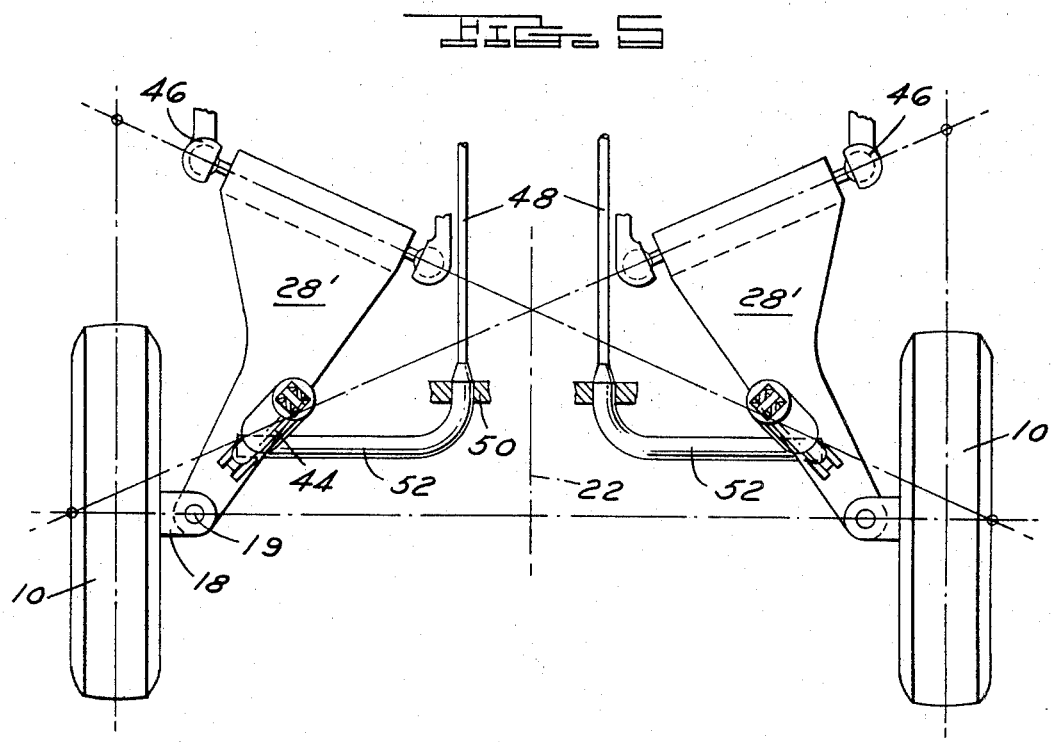
ACHILLE C. SAMPIETRO
INVENTOR
BY
John R. Faulkner
Robert E. McCollum
ATTORNEYS United States Patent Office
3,400,945
Patented Sept. 10, 1968

3,400,945
VEHICLE LEADING ARM SUSPENSION SYSTEM
Achille C. Sampietro, Bloomfield Hills, Mich., assignor to Ford Motor Company, Dearborn, Mich., a corporation of Delaware
Filed Nov. 3, 1966, Ser. No. 591,784
10 Claims. (Cl. 280—96.2)

This invention relates to a suspension system, and more particularly, to one for suspending the motor vehicle chasis from a pair of independently mounted steerable wheels.

One of the principal objects of the invention is to provide a leading arm type motor vehicle suspension system for independently mounting a pair of steerable wheels to the vehicle frame.

Another object of the invention is to provide a vehicle suspension system that provides correct wheel motion by limiting changes in caster and camber angles to values that are acceptable with modern tires, and by arranging such changes so that they offset each other.

A further object of the invention is to construct a suspension system that provides longitudinal compliance when the wheels move in jounce and rebound.

A still further object of the invention is to provide a vehicle suspension system that neutralizes or minimizes the effect of weight transfer during vehicle deceleration or braking operation to essentially eliminate brake-dive motion.

Another object of the invention is to provide a suspension system that is simple in construction and economical to manufacture, easy to fabricate, and easy to assemble and service.

It is also an object of the invention to provide a suspension system that permits latitude as to the degree of interconnection between the front and rear suspension systems of the vehicle.

It is also an object of the invention to provide a suspension system so disposed in the vehicle as to minimize interference with the engine cylinder head when either V or horizontally opposed type engines are used.

Other objects, features, and advantages of the invention will become apparent upon reference to the succeeding detailed description thereof, and to the drawings illustrating the preferred embodiments thereof, wherein:

FIGURE 1 is an isometric view of a portion of a suspension system embodying the invention;

FIGURES 2, 3 and 4 are front elevational, plan, and side elevational views, respectively, with parts broken away and in section, of an embodiment of the invention similar to that shown in FIGURE 1; and, FIGURES 5 and 6 are plan views of alternate embodiments of the invention.

Figure 3:
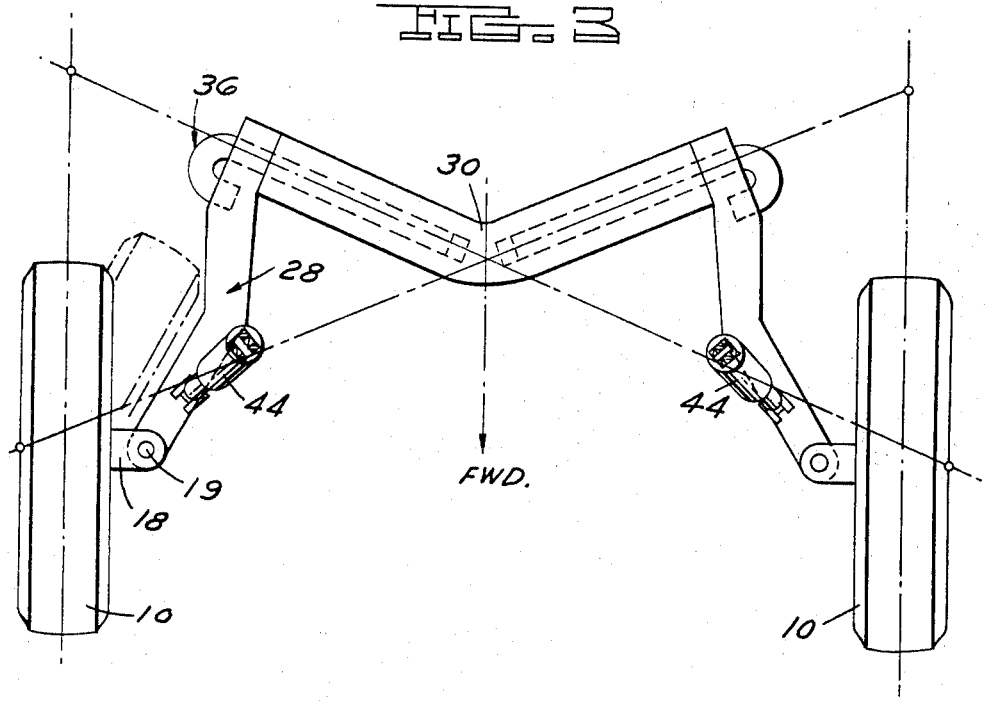

FIGURE 1 shows, isometrically, a portion of the suspension system for one front steerable wheel of a motor vehicle. For clarity, only the suspension arm, frame supporting spring, and immediately contiguous steering linkage have been shown. A road wheel 10 is rotatably mounted by suitable bearings, not shown, upon a wheel spindle 12 having a horizontally disposed axis 14. The disposition of the spindle axis in this case provides a zero camber angle to the wheel, thereby effectively cancelling any outwardly turning tendency of the wheel during forward motion, in a known manner.

Spindle 12 is integrally connected to a yoke-type king pin boss or member 16 that is positioned laterally inwardly of the wheel vertical centerline 18. The boss 16 has a bore 19 (FIGURE 2) that is adapted to contain a king pin, not shown. The vertical pivotal axis 20 of king pin bore 19 is inclined both rearwardly and laterally (sidewise) towards the vehicle longitudinal centerline 22. This not only provides an intersection of axes 18 and 20 below the road surface, but also provides a predetermined caster angle, to provide steering control of the wheel.

The below surface axes intersection imparts a toe-out tendency to the wheel, in a known manner. The caster angle, of course, not only provides a correct forward tracking of the wheels, but also causes the weight of the sprung mass of the vehicle (body, frame, etc.) to urge the wheels to pivot inwardly about the king pin axis 20, in a known manner.

The sidewise inclination of king pin axis 20 acts to counteract the effect due to caster by providing a stabilizing force that tends to keep the front wheels in a straight-ahead position.

It is to be noted, therefore, that the three interrelated controls, i.e., camber, caster, and sidewise inclination of king pin axis 20, are chosen so that the ratio of steering moment produced by caster change to steering moment produced by camber change will provide the desired amount of directional stability.

An shown in FIGURE 1, the king pin boss 16 is pivotally connected by an integral lever 24 to a tie rod 26 that, in turn, would be connected to the remaining portion of a suitable steering mechanism, not shown.

Figure 2:
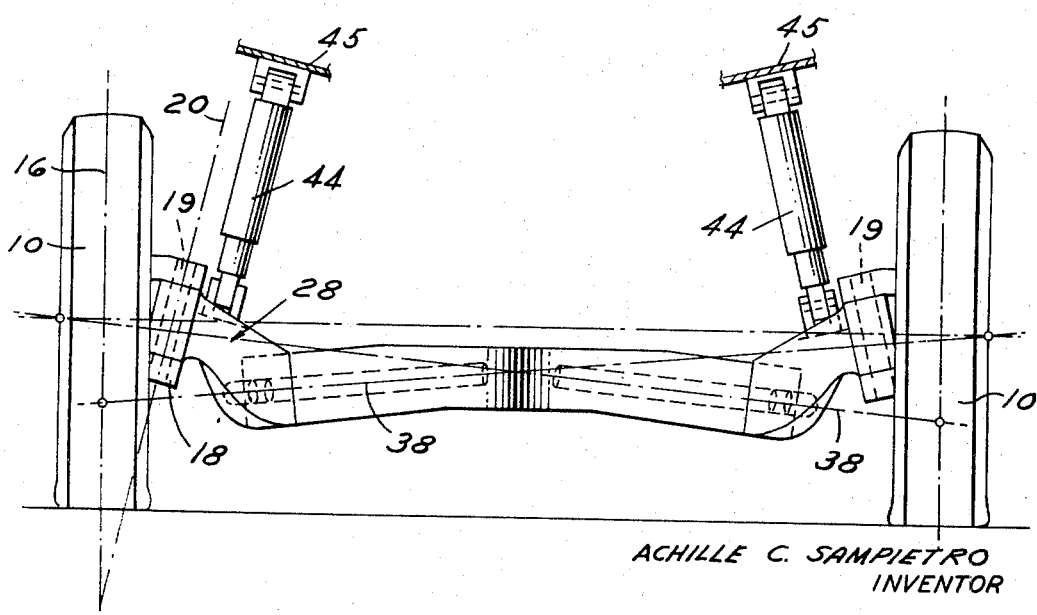

The C or yoke-shaped king pin boss 16 is pivotally connected to the forward end 27 of an essentially diagonally disposed suspension arm 28. In FIGURE 1, arm 28 is shown as a wishbone-like type, having an additional link 29 fixed to and extending rearwardly and downwardly from arm 28. In FIGURE 2, it is more of a single, right angled lever type. In either case, arm 28 extends both downwardly and rearwardly as shown more clearly in FIGURES 2 and 4, for a pivotal connection to a member 30 of the vehicle frame.

FIGURE 1 additionally shows a coil spring 32 surrounding a known type of shock absorber 34, to support the main weight of the vehicle chassis and body from the road wheels.

Referring now more particularly to FIGURES 2 through 4, and as best shown in FIGURE 3, the rearward portion of each arm 28 is fixed to the reversely bent end of a torsion bar 36 that is connected at its opposite end to the frame member portion 30. This latter connection can be either a rigid one, to transmit all the torque to the frame, or it could be a partial connection, to transmit only a portion of the torque to the frame. Such a variable type of interconnection is known, and will be referred to in more detail later. As thus far described, therefore, it will be clear that vertical movement of wheel 10 in jounce or rebound will be resisted in torsion by bar 36 acting through the frame connection, and that lifting of one side of the vehicle frame will be resisted in torsion by the bar 36 and wheel 10 on the opposite side.

As best seen in FIGURES 2 and 3, the pivot axis 38 for pivotal movement of each suspension arm 28 is inclined both downwardly and rearwardly away from the vehicle longitudinal centerline so as to be obliquely disposed or inclined with respect to a horizontal plane containing the centerline. With such a disposition of the pivot axis, it will be clear that when wheel 10, to which arm 28 is attached, moves arcuately upwardly, inwardly, and rearwardly, that the resultant change in wheel camber angle to a negative value, resulting in a change in the steering moment, effectively offsets the change in steering moment caused by the caster angle change; that is, with the axes 20 and 38 of the king pin and arm inclined as described, the combined changes in camber and caster as a result of the lifting movement of the wheel are controlled such that the steering moment produced by caster change is approximately equal to the steering moment produced by camber change so that the motion will not affect the steering.

It should be noted, from a consideration of FIGURE 4, that the rearward extension of suspension arm 28 is chosen such that a line 40 extending from the point of contact of wheel 10 with the road and passing through the pivot point 42 of suspension arm 28 with respect to the frame also passes through or near the center of gravity (not shown) of the vehicle. This provides an anti-dive control; i.e., the downwardly acting forces created by the transfer of weight from the rear to the front of the vehicle during a braking operation are partially or completely cancelled out by the oppositely acting braking reaction forces. Thus, brake-dive is retarded or prevented, in a known manner, depending upon whether the line of force 40 passes near or through the vehicle center of gravity.

The suspension system additionally includes a pair of shock absorbers 44 that can be of a known construction, hydraulic or otherwise. They would be pivotally connected at one end to the suspension arm 28, as shown in FIGURE 4, and at their opposite ends to a frame portion 45, as shown in FIGURE 2.

As described above, therefore, it can be seen that the suspension provides a correct wheel motion by limiting the changes in caster and camber to values that are acceptable with modern tires. Also, it can be seen that by disposing the suspension arm pivot axis 38 and inclination of king pin axis 20 in the manner described, that changes in caster and camber due to lifting of wheel 10 are effectively cancelled out so as to maintain steering stability at this time.

The torsion bars 36 shown in FIGURES 2 through 4 in this case provide an interconnection only between the two front wheels. That is, rise or fall of either wheel relative to the other produces a torsional moment on the frame that is resisted on the opposite side by the torsional moment acting in the opposite direction on the wheel.

FIGURES 5 and 6 show additional installations similar to that shown in FIGURES 2 through 4; however, in FIGURES 5 and 6, the spring systems for the front and rear wheels may be partially or completely interconnected, or totally disconnected from one another.

More specifically, both FIGURES 5 and 6 show the suspension arms 28′ as consisting of one-piece members each having an enlarged rear portion that is pivotally mounted on suitable bushings 46 fixed to the vehicle frame, not shown. It should be noted that the construcions in FIGURES 5 and 6 mount the suspension arm pivot axis 38′ in the same oblique manner, and tilt the king pin axis to the side and rear in the same manner as already described in connection with the FIGURES 1 through 4 constructions.

In FIGURE 5, a longitudinally extending torsion bar 48, extending essentially parallel to the vehicle longitudinal centerline 22 and to a horizontal plane containing that centerline, has a bushed connection to the frame at 50 and a right angled or bent end portion 52 connected to the suspension arm 28′. While the opposite rearward end of each torsion bar 48 is not shown, it will be clear that it could be connected directly to or formed integral with the end of a similar torsion bar connected to the rear wheel on the same side of the vehicle, so as to provide a fully interconnected suspension system. Alternately, the rear end of the torsion bar could be connected to the rear torsion bar through a frame mounted limited interconnecting means, previously mentioned, so that only a portion of the torque developed during jounce or rebound would be transmitted to the vehicle frame. Such partial, total or non-interconnection type of connecting means is fully shown and described in the copending application of William D. Allison, Ser. No. 544,756, filed Apr. 25, 1966, entitled Vehicle Variably Interconnected Suspension System, having a common assignee.

FIGURE 6 shows a construction similar to that of FIGURE 5, with, however, the torsion bars 48′ being mounted outboard of suspension arms 28′ and extending diagonally towards the rear of the vehicle.

From the foregoing, therefore, it will be seen that the invention provides a single suspension arm of the leading type for the independent mounting of the front wheels of a motor vehicle to the vehicle frame, and one that permits a partial, total, or non-interconnection between the front and rear wheel suspension systems of a motor vehicle. It will also be seen that as a result of the construction described and shown, a suspension system is provided that utilizes the braking reaction forces to neutralize the effect of weight transfer so that the car will be free from brake dive. It will also be seen that the invention provides a cancellation of the effects of caster and camber changes as the wheels swing arcuately during jounce to maintain steering stability.

While the invention has been described and illustrated in its preferred embodiments, it will be clear to those skilled in the arts to which the invention pertains that many changes and modifications may be made thereto without departing from the scope of the invention.

I claim:

1. A suspension system for a vehicle having a frame extending longitudinally from front to rear and a pair of steerable road wheels independently mounted thereon adjacent a forward portion thereof, comprising, a pair of arms each extending obliquely in opposite directions from said frame both in an essentially forward and upward direction and each having forward and rearward pivotal connections respectively to one of said wheels and said frame, each of the rearward pivotal connections including a laterally extending arm pivotal axis inclined essentially downwardly and rearwardly with respect to a longitudinally extending horizontal plane containing the horizontal centerline of said vehicle for an arcuate swinging movement of said arm with respect to said frame about an obliquely disposed axis, each of the forward pivotal connections including an essentially horizontally disposed shaft rotatably mounting one of said wheels, and pivot means pivotally connecting each of said shafts to its associated arm, said pivot means being so constructed and arranged to provide a shaft axis of pivotal movement for each wheel that is inclined laterally and rearwardly with respect to a plane containing the vertical centerline of the wheel, and spring means between each of said arms and frame resisting relative pivotal movement therebetween upon movement of said wheels in jounce and rebound.

2. A suspension system as in claim 1, the pivot axis of each of said arms being substantially perpendicular to the oblique longitudinal extension of said arm.

3. A suspension system as in claim 1, each of said spring means comprising a torsion bar.

4. A suspension system as in claim 3, each of said torsion bars being mounted coaxially within the arm associated therewith and fixed at opposite ends thereof respectively to said arm and a portion of said frame.

5. A suspension system as in claim 3, each of said torsion bars being connected to said frame and extending obliquely from front to rear of said frame essentially parallel to the longitudinal extension of the arm associated therewith and having an angled end portion fixed to the said associated arms.

6. A suspension system as in claim 1, said arms being rotatably journaled in a member of said frame interconnecting said arms.

7. A suspension system as in claim 3, each of said torsion bars extending longitudinally of and essentially parallel to said frame from front to rear, said bars being connected to said frame and each having an angled end portion fixed to one of said arms.

8. A suspension system for a vehicle having a frame extending longitudinally from front to rear and a pair of steerable road wheels independently mounted thereon adjacent a forward portion thereof, comprising, a pair of leading suspension arms each extending essentially obliquely in opposite directions from said frame both in an essentially forward and upward direction and each having forward and rearward pivotal connections respectively to one of said wheels and said frame, each of the rearward pivotal connections including a laterally extending arm pivotal axis inclined essentially downwardly and rearwardly with respect to a longitudinally extending horizontal plane containing the horizontal centerline of said vehicle for an arcuate swinging movement of said arm with respect to said frame about an obliquely disposed axis, each of the forward pivotal connections including an essentially horizontally disposed wheel spindle rotatably mounting one of said wheels with minimum camber angle, and vertically inclined kingpin means connecting each of said spindles to the associated suspension arm, said kingpin means having a sidewise and rearward inclination providing a predetermined castor angle and a control of the pivotal movement of each wheel, and torsion bar spring means between each of said arms and frame resisting relative pivotal movement therebetween upon movement of said wheels in jounce and rebound.

9. A suspension system as in claim 8, each of said torsion bars being connected to said frame and extending obliquely from front to rear of said frame essentially parallel to the longitudinal extension of the arm associated therewith and having an angled end portion fixed to the said associated arm.

10. A suspension system as in claim 8, each of said torsion bars extending longitudinally of and essentially parallel to said frame from front to rear, said bars being connected to said frame and each having an angled end portion fixed to one of said arms.

References Cited

UNITED STATES PATENTS

| | | | |
|---|---|---|---|
| 1,987,791 | 1/1935 | Opolo | 280—93 X |
| 2,210,485 | 8/1940 | Hawkins | 280—104 |
| 2,555,649 | 6/1951 | Krotz | 280—124 X |
| 2,631,844 | 3/1953 | Paton | 280—124 X |
| 2,906,543 | 9/1959 | Polhemus | 280—104 |
| 3,033,586 | 5/1962 | Rosenkrands | 267—20 X |
| 3,278,196 | 10/1966 | Van Winsen | 280—96.2 |

FOREIGN PATENTS

| | | |
|---|---|---|
| 1,188,771 | 3/1959 | France. |
| 723,044 | 12/1965 | Canada. |

KENNETH H. BETTS, *Primary Examiner.*